United States Patent [19]

Hong et al.

[11] Patent Number: 5,621,037

[45] Date of Patent: Apr. 15, 1997

[54] RUBBER SOLUTION AND RUBBER CONCRETE USING THE SAME

[75] Inventors: Young-keun Hong, 1-1508, Sunkyung Apt., 506, Daechi-dong, Kangnam-gu, Seoul; Kyung-ho Chung, Seoul, both of Rep. of Korea

[73] Assignee: Young-Keun Hong, Seoul, Rep. of Korea

[21] Appl. No.: 336,578

[22] Filed: Nov. 9, 1994

[30] Foreign Application Priority Data

Feb. 18, 1994 [KR] Rep. of Korea .......................... 94-2857
Nov. 3, 1994 [KR] Rep. of Korea ....................... 94-28698

[51] Int. Cl.⁶ ............................... C08J 5/10; C08K 5/02; C08L 17/00
[52] U.S. Cl. ........................... 524/464; 524/84; 524/236; 524/332; 524/430; 524/418; 524/492; 523/212
[58] Field of Search ............................... 524/2, 464, 492, 524/493, 418, 84, 236, 332, 430; 523/212

[56] References Cited

U.S. PATENT DOCUMENTS 3,563,922  2/1971  Massoubre ................ 260/2.3
4,086,291  4/1978  Svensson ................. 260/758
4,534,815  8/1985  Hamada et al. ............. 156/307.5
5,290,356  3/1994  Frankowski ............... 106/726
5,405,881  4/1995  Schneider et al. ........... 523/145
5,424,376  6/1995  Chang et al. .............. 525/480

*Primary Examiner*—Paul R. Michl
*Assistant Examiner*—U. K. Rajguru
*Attorney, Agent, or Firm*—Dvorak and Traub

[57] ABSTRACT

A pre-treated rubber, a rubber solution and a rubber concrete using the pre-treated rubber or the rubber solution are described. Rubber products such as a rubber concrete manufactured by molding processing of the pre-treated rubber, a rubber solution prepared by dissolving vulcanized rubber in a chlorine-substituted hydrocarbon solvent, of compositions including the pre-treated rubber or the rubber solution, pebbles, sand, etc. have high strength and have good restraining effect on noise and vibration. Moreover, waste resources such as tires can be advantageously reused.

10 Claims, No Drawings

RUBBER SOLUTION AND RUBBER CONCRETE USING THE SAME

BACKGROUND OF THE INVENTION

The present invention relates to a rubber solution and rubber concrete using the same, and more particularly, to a rubber solution prepared by dissolving vulcanized rubber in an appropriate solvent and rubber concrete manufactured by using the same.

In recent times, refuse such as waste rubber, especially tires, is on the rise as a pollutant worldwide. Particularly, research into the reuse of waste tires has been continuously carried out, but there has yet been no appropriate usage found. So far, waste tires have been applied as bumpers for ships, as a filler for new rubber in a finely pulverized form, used as a fuel through incinerating, which is known as the most economical method or reused as a raw material for the tire plasticized through heat or chemical treatment processes.

In a Korean patent (No. 82-665 to Bridgestone Kabushiki Kaisha), a method for using a waste tire as a fuel in a cement kiln instrument is described.

Although the confronting pollution problem due to waste tires could be solved by using the tires as a heat source through firing, this is not a preferred method when considering the environment. For example, when the waste tire is fired as a heating source, a secondary pollutant such as harmful gases like $SO_2$, $NO_2$, $Cl_2$, etc. as well as an offensive odor are produced, which greatly contributes to air pollution.

The reproduction method of the waste tire is comprised of mixing pulverized waste rubber by means of mechanical energy or thermal energy and processing the mixture to change the rubber into a state in which cross-links could be made. That is, the network structure of the rubber is broken to shorten the chain length, and new double bonds are formed to possibly make new cross-links.

In Popular Science, October 1994, 83p, the following techniques are disclosed.

First, Titan Technology of Albuquerque, N.M. Co. in America discloses a method for extracting oil from the waste tires at high temperature of about 450° F. using inorganic or organic catalyst and recovering carbon black and ash from the residue. The obtained oil is actually shortened carbon chain.

Also, Avraam I. Isayev at Akron University in America discloses a method for obtaining highly viscous fluid like bread dough by treating the waste tires at high temperature of about 450° F. and exposing to ultrasound of about 2,000 cycles. However, the obtained material is not a solution, this method is not a way to get solution from waste tire, but one of the ways to devulcanized waste rubber, thus just endow plasticity to rubber.

Requirement on the method for completely dissolving the vulcanized rubber using a solvent is gradually increased.

Meanwhile, concrete made of portland cement, which is the most common material in use in the civil engineering and construction industry, is widely used owing to its good characteristics and diverse usage. However, this type of concrete needs much improvement because of such drawbacks as low tenacity, low pliability, and poor durability.

SUMMARY OF THE INVENTION

One object of the present invention considering the conventional problems is to provide a novel rubber solution which is prepared by dissolving vulcanized rubber using a chemical solvent and thus it has various practical applications.

Another object of the present invention is to provide a novel rubber concrete which is manufactured using the rubber solution and has a high strength and good diminishing effects against noise and vibration.

To accomplish the object, there is provided in the present invention, a rubber solution prepared by dissolving vulcanized rubber in chlorine-substituted hydrocarbon solvents.

To accomplish another object, there is provided in the present invention a rubber concrete manufactured by molding processing of a composition comprising the rubber solution prepared by dissolving vulcanized rubber in chlorine-substituted hydrocarbon solvents.

The chlorine-substituted hydrocarbons such as 1,1,1-trichloroethane, 1,1,2-trichloroethane, trichloroethylene, tetrachloroethylene, 1,1,2,2-tetrachloroethane and mixtures thereof could be preferably used.

The rubber solution of the present invention is prepared by dissolving vulcanized rubber in appropriate solvents and can be advantageously applied in various products. Rubber concrete manufactured by using the rubber solution is stable with respect to temperature, chemicals, moisture, etc., and has high strength and good resistance to noise and vibration.

DETAILED DESCRIPTION OF THE INVENTION

The inventor of the present invention noticed that the rubber solution obtained by dissolving rubber has diverse applications such as a material for use in civil engineering and the construction industry as well as for rubber products, and further noticed that improvement was needed on the inherent drawbacks of the physical properties of the portland cement concrete, that is, its weak strength, low tenacity, low pliability and poor durability. Accordingly, a method for dissolving pre-treated rubber in solvents is provided in the present invention. Also, a rubber concrete manufactured by mixing the dissolved solution with dried artificial or natural pebbles, sand, etc. and a molding process, and thus includes rubber as a matrix instead of a cement in the conventional cement concrete is also provided in the present invention.

The inventor of the present invention has discovered solvents which could dissolve pre-treated rubber (for example, tires, rubber balls, shoes, etc.) and has repeated research on a simple dissolving process, and has ultimately discovered that halogen-substituted hydrocarbons among many organic solvents could advantageously dissolve rubber. Among them, the preferred solvents having good dissolving power are chlorine-substituted hydrocarbons such as 1,1,1-trichloroethane, 1,1,2-trichloroethane, trichloroethylene, tetrachloroethylene and 1,1,2,2-tetrachloroethane.

The rubber solution of the present invention could be advantageously prepared by pulverizing vulcanized rubber to the size of about 20–30 mesh, the obtained powder mixed with 5 to 10 weight percent of pine tar oil based on the vulcanized rubber, treating the thus-obtained mixture at about 100°–150° C. under a pressure of about 150–170 psi for about 30 to 60 minutes, and dissolving the mixture in the above-described solvents.

The rubber concrete of the present invention could be manufactured by adding pebbles, sand, etc. to the rubber solution and then performing a molding process.

Desirably, additional agents such as sulfur, morpholynobenzothiazol, diphenylguanidine,-hexamethylenetetramine or 1,2,2-tetramethylthiuramdisulfide, zinc oxide or manganese oxide, and stearic acid can be included during the manufacture of the rubber concrete.

That is, the rubber concrete of the present invention is preferably manufactured through mixing a rubber solution with a silane coupling agent-coated pebbles and sand and additional agents, and heat-treating at about 120°–150° C. under a pressure of 100–200 kg/cm$^2$, and thus cross-linking the rubber components.

The rubber concrete of the present invention can be obtained with the above rubber solution only, and without adding pebbles, sand, etc. Therefore, the thus-obtained rubber concrete is also included in the scope of the present invention.

The inventor discovered that a rubber concrete manufactured by molding processing of partially devulcanized and pre-treated rubber prepared through pulverizing, mixing with pine tar oil and treating under a predetermined temperature and pressure, has better processability and admixing characteristics than the concrete manufactured from the conventionally pulverized rubber. Therefore, the rubber concrete manufactured by molding processing of the pre-treated rubber only and a rubber concrete manufactured by mixing the pre-treated rubber with artificial or natural pebbles, sand, etc. and molding processing, are also included in the present invention.

A preferred embodiment of the present invention will be described in detail below.

Pre-treatment

A waste tire was pulverized by means of a hammer mill at −60° C. to −80° C., and was further pulverized by means of a cracker mill. Large rubber particles were separated by means of rotation-type separation screen and were returned to the cracker mill to reduce their size. The waste rubber was pulverized eventually to the size of about 20–30 mesh through this process and was mixed with pine tar oil. Thereafter, the mixture was treated at about 100°–150° C. under a pressure of 150–170 psi in an autoclave to obtain pre-treated rubber.

As described above, a rubber concrete manufactured from this pre-treated rubber only or from the mixture of this pre-treated rubber with sand, pebbles, etc. was manufactured.

Dissolving

The rubber obtained through the pre-treating process was mixed with 1,1,2,2-tetrachloroethane and the temperature of the mixture was increased so as to completely dissolve the rubber. The pre-treated rubber started to dissolve at a temperature of about 60° C. or higher, and in the case of 140° C. which was just below the boiling point of 1,1,2,2-tetrachloroethane,(146.5° C.) in a 10 g/dl concentration, the rubber dissolved in fifteen minutes. From an inspection of the solubility, it was known that the rubber could be dissolved to the concentration of 50 g/dl at 120° C.

Mixing and molding

The thus-prepared rubber solution (assumed 100 wt), 5–10wt % of sulfur, 5–10wt % of morpholynobenzothiazole, 3–5wt % of zinc oxide and 3–5wt % of stearic acid were mixed to prepare a rubber solution mixture.

Pebbles and sand were immersed in an silane coupling agent for about 1–3 hours and then dried at about 30°–40° C. for 24 hours.

Then, 10–100 wt % of the rubber solution mixture, 30–80 wt % of dried silane coupling agent-coated pebbles, and 20–60 wt % of dried silane coupling agent-coated sand, based on the total weight of the mixture composition, were mixed to manufacture a rubber concrete composition.

The composition was poured in a cylindrical casting having a diameter of 10 cm and a height of 20 cm and a rectangular hexahedron casting of 15 cm×15 cm×53 cm, was hardened by means of a vibrator for ten minutes and was thermally treated under a pressure of about 100–200 kg/cm$^2$ at 120°–150° C. for about one hour, thereby manufacturing the rubber concrete.

The solvent, 1,1,2,2-tetrachloroethane was preferably and economically recovered for reuse from the rubber solution or from the composition of the rubber solution mixed with other components. For efficient solvent extraction, a super critical fluid extraction method using carbon dioxide as a fluid at 25°–55° C. under 60–200 atm was preferably applied in the present invention.

A breaking test was carried out on the thus-manufactured rubber concrete using an universal testing machine, and the result is shown in Table 1 & 2. Table 1 corresponds to a rubber concrete manufactured by using a pre-treated rubber itself and a mixture of that rubber with pebbles, sand, etc., and Table 2 corresponds to a rubber concrete manufactured by using a rubber solution itself and a mixture of that rubber solution with pebbles, sand, etc. The load applied during the breaking test was speed up 5 mm per second until the tested sample broke. A compressive strength test, tensile strength test, bending strength test and modulus test were carried out in accordance with the methods prescribed in KSF 2405, KSF 2423, KSF 2407 and KSF 2438, respectively.

TABLE 1

| test item | compression strength | tensile strength | bending strength | modulus |
|---|---|---|---|---|
| result (kgf/cm$^2$) | 240–960 | 26–104 | 20–170 | 15E4-30E4 |

TABLE 2

| test item | compression strength | tensile strength | bending strength | modulus |
|---|---|---|---|---|
| result (kgf/cm$^2$) | 440–1650 | 86–164 | 210–320 | 27E4-33E4 |

For comparison, physical properties of the conventional concrete made of portland cement are illustrated in Table 3.

TABLE 3

| test item | compression strength | tensile strength | bending strength | modulus |
|---|---|---|---|---|
| result (kgf/cm$^2$) | 100–600 | 10–50 | 20–70 | 20E4-40E4 |

From the tables, it is confirmed that the rubber concretes of the present invention has roughly good physical properties though the modulus is somewhat low.

Particularly, the rubber concrete manufactured by using a mixture of the rubber solution with sand, pebbles, etc. has especially high strength due to compact adhesion of the rubber solution with sand, pebbles, etc.

The rubber solution and the rubber concrete of the present invention is durable to harsh environments such as temperature, chemicals, humidity, etc. Also, since the products manufactured from the rubber solution of the present invention own the properties of the rubber component, they come to have high strength, are light weight and show good resistance to noise and vibration. Therefore, they are advantageously applicable for many uses such as road pavement, railroad ties, materials for ocean rescue, etc.

What is claimed is:

1. A rubber concrete manufactured by a molding process, said concrete free of cement and having a composition comprising a rubber solution prepared by dissolving vulcanized rubber in a chlorine-substituted hydrocarbon solvent wherein said chlorine-substituted hydrocarbon solvent is at least one solvent selected from the group consisting of 1,1,1-trichloroethane, 1,1,2-trichloroethane, trichloroethylene, tetrachloreoethylene and 1,1,2,2-tetrachloroethane.

2. A rubber concrete as claimed in claim 1, wherein said rubber solution is prepared by the steps of:

pulverizing a weighted amount of vulcanized rubber to the size of a 20–30 mesh;

mixing the pulverized rubber with a 5–10 wt % of pine tar oil based on the vulcanized rubber weight to obtain a mixture;

pre-treating the obtained mixture at about 100°–150° C. under a pressure of about 150–170 psi for about 30 to 60 minutes; and dissolving the thus obtained pre-treated mixture in said chlorine-substituted hydrocarbon solvent; then heat treating the dissolved mixture at about 120°–150° C., under a pressure of about 100–200 kg/cm$^2$ for about one hour.

3. A rubber concrete as claimed in claim 1, wherein said composition further comprises pebbles and sand.

4. A rubber concrete as claimed in claim 1, wherein said composition further comprises sulfur, morpholynobenzothiazole, diphenylguanidine, one of hexamethylenetetramine and tetramethyldiuramdisulfide, one of zinc oxide and manganese oxide, and stearic acid.

5. A rubber concrete as claimed in claim 1, having physical properties of a compressive strength of 240–1650 kgf/cm$^2$, a tensile strength of 26–164 kgf/cm$^2$, a bending strength of 20–320 kgf/cm$^2$, and an elasticity coefficient of 15E4–33E4 kgf/cm$^2$.

6. A method for manufacturing a rubber concrete comprising the steps of molding processing of a composition comprising a rubber solution prepared by dissolving vulcanized rubber in a chlorine-substituted hydrocarbon solvent wherein said chlorine-substituted hydrocarbon solvent is at least one solvent selected from the group consisting of 1,1,1,-trichloroethane, 1,1,2-trichloroethane, trichloroethylene, tetrachloroethylene and 1,1,2,2-tetrachlorethane, and wherein said solvent is recovered by a super critical fluid extraction method using carbon dioxide.

7. A rubber concrete prepared by the steps of:

pulverizing a weighted amount of vulcanized rubber to the size of a 20–30 mesh;

mixing the pulverized rubber with a 5–10 wt % of pine tar oil based on the vulcanized rubber weight;

pre-treating the obtained mixture at about 100°–150° C. under a pressure of about 150–170 psi for about 30 to 60 minutes;

dissolving the obtained mixture in a chlorine-substituted hydrocarbon solvent wherein said chlorine-substituted hydrocarbon solvent is at least one solvent selected from the group consisting of 1,1,1,-trichloroethane, 1,1,2-trichloroethane, trichloroethylene, tetrachloroethylene and 1,1,2,2-tetrachlorethane; and then molding processing the pre-treated mixture by heat-treating at about 120°–150° C. under a pressure of about 100–200 kg/cm$^2$ for about one hour.

8. The rubber concrete as claimed in claim 7, wherein said pre-treated mixture further comprises silane-coated pebbles and sand.

9. The rubber concrete as claimed in claim 7, wherein said pre-treated mixture further comprises naturally-occurring pebbles and sand.

10. The rubber concrete as claimed in claim 7, wherein said solvent is recovered by a super critical fluid extraction method using carbon dioxide.

* * * * *